United States Patent
Fernandez et al.

(10) Patent No.: US 9,299,376 B1
(45) Date of Patent: Mar. 29, 2016

(54) METHOD OF PATTERNING SELF-ASSEMBLED MONOLAYER ON SLIDER

(71) Applicant: Seagate Technology LLC, Cupertino, CA (US)

(72) Inventors: Robert Anthony Fernandez, Bloomington, MN (US); David James Ellison, Minneapolis, MN (US); Daniel Richard Buettner, Savage, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/810,864

(22) Filed: Jul. 28, 2015

(51) Int. Cl.
*G11B 5/60* (2006.01)

(52) U.S. Cl.
CPC .......................................... *G11B 5/60* (2013.01)

(58) Field of Classification Search
CPC ............ G11B 5/127; G11B 5/11; G11B 5/60; G11B 21/24
USPC ....................................... 360/235–235.9, 128
See application file for complete search history.

(56) References Cited

U.S. PATENT DOCUMENTS

| 7,491,286 | B2 | 2/2009 | Kagan et al. | |
|---|---|---|---|---|
| 8,883,646 | B2 | 11/2014 | Huang et al. | |
| 2010/0068798 | A1* | 3/2010 | Solomon | A61B 5/145 435/287.2 |
| 2014/0193185 | A1* | 7/2014 | Kami | G03G 21/0035 399/346 |
| 2014/0247519 | A1* | 9/2014 | Takizawa | G11B 5/72 360/110 |
| 2014/0377143 | A1* | 12/2014 | Ellison | G11B 25/043 422/222 |
| 2015/0015996 | A1 | 1/2015 | Rajasekharan et al. | |
| 2015/0179216 | A1* | 6/2015 | Engelkes | G11B 23/505 360/235.4 |

OTHER PUBLICATIONS

Smith, R.K., "Patterning self-assembled monolayers," Progress in Surface Science 75, 2004, pp. 1-68, University Park, PA.
Hiroyuki, S., "Micropatterning of Alkyl- and Fluoroalkylsilane Self-Assembled Monolayers Using Vacuum Ultraviolet Light," Langmuir, vol. 16, No. 3, 2000, pp. 1-4, Nagoya, Japan.

* cited by examiner

*Primary Examiner* — Allen T Cao
(74) *Attorney, Agent, or Firm* — HolzerIPLaw, PC

(57) ABSTRACT

Methods for providing a SAM (self-assembled monolayer) coating on a slider and subsequently removing a portion of the SAM coating. In one implementation, the method includes applying a SAM coating on at least a first surface of a slider and on a second surface of the slider opposite the first surface, and removing at least a portion of the SAM coating from the second surface by irradiating the second surface with UV radiation in a wavelength range of 100-200 nm.

20 Claims, 5 Drawing Sheets

METHOD OF PATTERNING SELF-ASSEMBLED MONOLAYER ON SLIDER

BACKGROUND

Hard disc drives are common information storage devices having a series of rotatable discs that are accessed by magnetic reading and writing elements. These data elements, commonly known as transducers, or merely as a transducer, are typically carried by and embedded in a slider that is held in a close relative position over discrete data tracks formed on a disc to permit a read or write operation to be carried out.

As distances between the slider and the disc decrease, due to the ever-growing desire to reduce the size of the disc drive and to pack more data per square inch, the potentially negative impact due to contamination on the slider, disc, or other disc drive component increases. Unwanted contaminants anywhere in the disc drive can adversely affect fly height behavior, such as with elevated or decreased fly height, create fly asymmetry in roll or pitch character, produce excessive modulation, and even result in head-disc crashing or contact.

To reduce contamination in and on parts of the disc drive, self-assembled monolayer (SAM) materials have been applied to various parts including the slider. Improvements in applying (coating) the SAM material on to the slider are needed.

SUMMARY

Generally, the methods of this disclosure are directed to applying a self-assembled monolayer (SAM) material onto a slider surface and then removing at least a portion of the SAM material from the back pad of the slider.

One particular implementation described herein is a method that includes applying a SAM coating on at least a first surface of a slider and on a second surface of the slider opposite the first surface, and then removing at least a portion of the SAM coating from the second surface by irradiating the second surface with UV radiation in a wavelength range of 100-200 nm.

Another particular implementation is a method of providing a slider having an air-bearing surface (ABS), a leading face, a trailing face, opposite side walls extending and connecting the leading face and the trailing face, and a back pad opposite the ABS, with a self-assembled monolayer (SAM) material present on each of those surfaces; and irradiating the back pad with UV radiation in a wavelength range sufficient to remove the SAM material from the back pad while retaining the SAM material on the leading face, the trailing face and the side walls.

Yet another particular implementation is a slider that has an air-bearing surface (ABS), a leading face, a trailing face, opposite side walls extending and connecting the leading face and the trailing face, and a back pad opposite the ABS. A SAM coating covers the entire ABS but does not cover the entire back pad.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWING

The described technology is best understood from the following Detailed Description describing various implementations read in connection with the accompanying drawings.

DETAILED DESCRIPTION

As discussed above, hard disc drive assemblies include a slider that is designed and configured to glide on an air bearing over a magnetic data storage disc. Contaminants, on the slider, on the disc, or elsewhere in the disc drive assembly, can interfere with the proper performance of either or both the "read" operation and the "write" operation of the disc drive. To reduce the potential for contaminants on the slider, a self-assembled monolayer (SAM) coating is applied to the air-bearing surface of the slider, which is the face of the slider that opposes the disc, before the slider is assembled into the disc drive. Because of the size of the slider and the SAM coating (deposition) process, other surfaces of the slider also become coated with the SAM coating. A SAM coating on certain surfaces is undesired for various reasons, thus it is desired to remove this SAM coating from these surfaces.

This disclosure is directed to methods of removing organic materials, but particularly SAM materials, from surfaces, such as the back pad of the slider.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Figure 1:
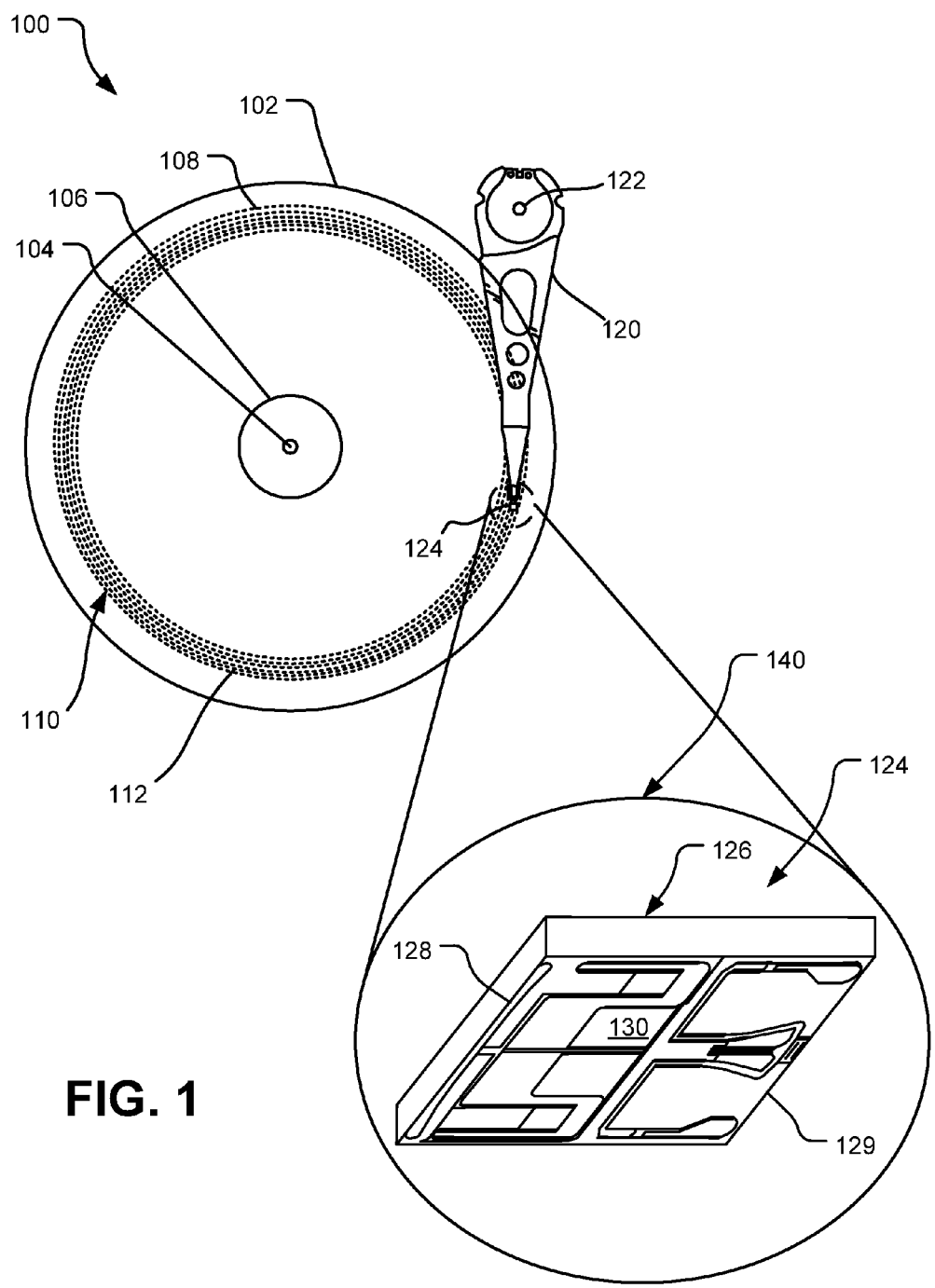
FIG. 1 is a schematic partial top view, partial perspective view of a disc drive assembly.
Figure 2A:
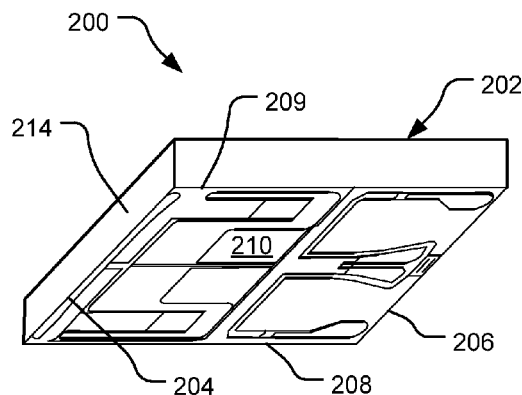
FIG. 2A is a perspective view of a slider with an example an air-bearing surface (ABS)
Figure 2B:
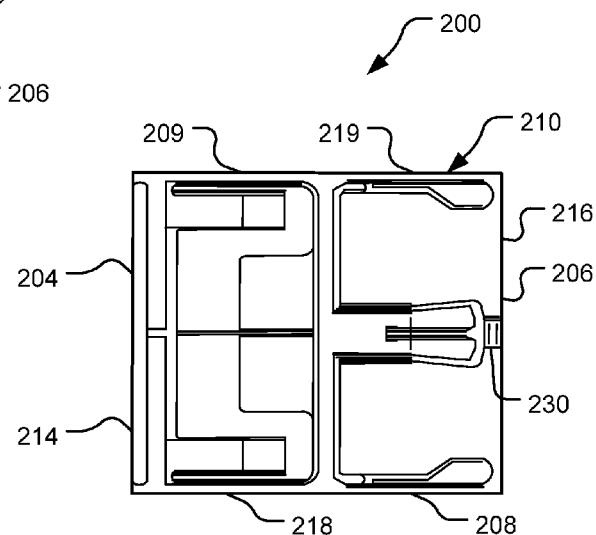
FIG. 2B is a plan view of the ABS of the slider.
Figure 2C:
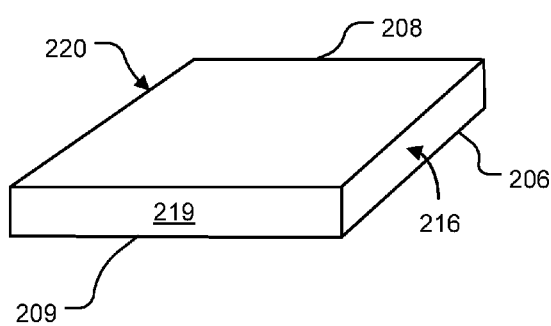
FIG. 2C is an alternate perspective view of the slider.
Figure 2D:
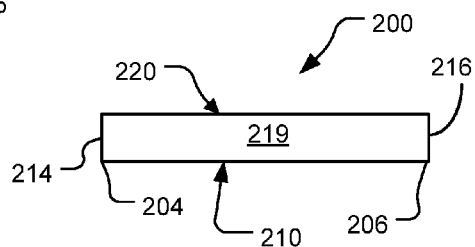
FIG. 2D is a side view of the slider.

FIG. 1 illustrates a perspective view of an example recording device, or, disc drive assembly 100. Disc drive assembly 100 includes a disc 102, which rotates about a spindle center or a disc axis of rotation 104 during operation. The disc 102 includes an inner diameter 106 and an outer diameter 108 between which are a number of concentric data tracks 110, illustrated by circular dashed lines. The data tracks 110 are substantially circular and are made up of regularly spaced bits 112, indicated as dots on the disc 102. It should be understood, however, that the described technology may be employed with other types of storage media, including continuous magnetic media, discrete track (DT) media, etc.

Information may be written to and read from the bits 112 on the disc 102 in different data tracks 110. An actuator assembly 120 having an actuator axis of rotation 122 supports a slider 124 with a transducer in close proximity above the surface of the disc 102 during disc operation; not seen in FIG. 1, the slider 124 is connected to the actuator assembly 120 by a head-gimbal-assembly (HGA). The surface of the slider 124 closest to and opposite to the disc 102 is called the air-bearing surface (ABS). In use, the actuator assembly 120 rotates during a seek operation about the actuator axis of rotation 122 to position the slider 124 over a target data track of the data tracks 110. As the disc 102 spins, a layer of air forms between the slider 124 and the surface of the disc 102, resulting in the slider 124 'flying' above the disc 102. The transducer on the slider 124 then reads or writes data to the bits 112 in the target data track 110.

An exploded view 140 illustrates an expanded view of the slider 124. The slider 124 has a body 126 with a leading edge 128 and a trailing edge 129, with an air-bearing surface (ABS) 130 between the leading edge 128 and the trailing edge 129. The ABS 130 is the surface or face of the slider 124 positioned opposite the surface of the disc 102; that is, the ABS 130 is facing the disc 102. Not seen in this figure, opposite the ABS 130 is a back pad. A transducer 132 (which includes read/write head(s)) is located on or close to the trailing edge 129.

FIGS. 2A, 2B, 2C and 2D are enlarged views of a slider 200, showing various features. As indicated above, the slider 200 has a body 202 having a leading edge 204, a trailing edge 206 and two side edges 208, 209 connecting leading edge 204 and trailing edge 206 of body 202. These edges 204, 206, 208, 209 bound the air-bearing surface (ABS) 210. Orthogonal to the ABS 210 is a leading face 214 at the leading edge 204, and similarly, at the trailing edge 206 is a trailing face 216. Side edges 208, 209 have corresponding side faces or walls 218, 219, respectively. Opposite the ABS 210 is a back surface or back pad 220, seen in FIGS. 2C and 2D. On the ABS 210 is a transducer area 230 that includes a read head and a write head, not detailed. In other implementations, the transducer area 230 may be on the trailing face 216, or, the transducer area 230 may be split between the ABS 210 and the trailing face 216.

The ABS 210 has various topological features to control the aerodynamic performance of slider 200 as it flies over a rotating magnetic disc. The ABS 210 includes structural features such as rails, lands, ramps, recesses or depressions and the like that are designed to maximize the air-bearing surface pressure created by the stream of air flowing between the ABS 210 and the disc. In some implementations, a trench to divert and/or manage airflow is present in front of (i.e., of the leading side of) the transducer area 230. The topographical features of the ABS 210 are generally symmetrical along a center axis, from leading edge 204 to trailing edge 206. Although one particular embodiment of a slider has been illustrated in FIGS. 2A through 2D, it is understood that the particular topographical features may have any number of various alternate configurations, which will vary depending on the size of the slider, the manufacturer, and the model or version.

Many sliders 200 include a protective overcoat over various features of slider 200, particularly over the entire ABS 210. The protective overcoat may be, for example, diamond-like carbon (DLC), which has a crystal lattice similar to diamond, and/or an amorphous layer. In some embodiments, the protective overcoat may have a {100} crystal plane.

Present on the ABS 210, over the protective overcoat if present, is a SAM. The terms "self-assembled monolayer," "SAM," and variants thereof, as used herein, refer to a thin monolayer of surface-active molecules provided (e.g., adsorbed and/or chemisorbed) on a surface to produce chemical bonds therebetween. The molecules may have been present, for example, in a reaction solution or a reactive gas phase. Having a SAM material on the ABS 210 reduces the adhesion and/or collection of contaminants on the protective overcoat, if present, and the slider.

Any SAM coating or coatings can be applied to the slider 210. The SAM coating is present on at least the ABS 210. In some implementations, the SAM coating is also present on the trailing face 216. The coating is comprised of at least one SAM material and can be either a high surface energy coating or a low surface energy coating. The coating can be oleophobic or oleophilic, hydrophobic or hydrophilic. The SAM coating inhibits the presence and/or accumulation of contaminant on the slider; that is, contaminant is less likely to stick or attach to the slider.

The term "low surface energy" and variations thereof, as used herein, refers to the tendency of a surface to resist wetting (high contact angle) or adsorption by other unwanted materials or solutions. In a low surface energy SAM, the functional terminal groups of the molecules are chosen to result in weak physical forces (e.g., Van der Waals forces) between the coating and contaminant. A low surface energy SAM allows for partial wetting or no wetting of the resulting SAM coating (i.e., a high contact angle between a liquid and the coating). Conversely, "high surface energy" refers to the tendency of a surface to increase or promote wetting (low contact angle) or adsorption of the surface of contaminants. In a high surface energy SAM, the functional terminal groups of molecules are chosen to result in a stronger molecular force between the coating and contaminant. If both a high surface energy coating and a low surface energy coating are present, the surface energies are relative. Values that are typically representative of "low surface energy" are in the range of 5-30 dyne/cm and high surface energy materials are relatively higher than this range, typically anything greater than 30 dyne/cm.

The phrase "oleophilic SAM" and variations thereof as used herein refers to a SAM having an oleophilic functional end group, such as saturated hydrocarbons. Other particular examples of suitable terminal groups include alkyls with 1-18 carbon atoms in addition to other unsaturated hydrocarbon variants, such as, aryl, aralkyl, alkenyl, and alkenyl-aryl. Additionally, materials with amine terminations, as well as carbon oxygen functional groups such as ketones and alcohols, will exhibit oleophilic properties.

The phrase "oleophobic SAM" and variations thereof as used herein refers to a SAM having an oleophobic functional end group, such as halosilanes and alkylsilanes. Particular examples of suitable halosilane and alkylsilane terminal groups include fluorinated and perfluorinated. In some implementations, an oleophobic SAM is also hydrophobic, thus being amphiphobic.

The precursor compound for forming the SAM coating contains molecules having a head group and a tail with a functional end group. Common head groups include thiols, silanes with hydrolizable reactive groups (e.g., halides: {F, Cl, Br, I}, and alkoxys: {methoxy, ethoxy, propoxy}, phosphonates, etc. Common tail groups include alkyls with 1-18 carbon atoms in addition to other unsaturated hydrocarbon variants, such as, aryl, aralkyl, alkenyl, and alkenyl-aryl. In addition, the hydrocarbons materials listed above can be functionalized with fluorine substitutions, amine terminations, as well as carbon oxygen functional groups such as ketones and alcohols, etc., depending on the desired properties of the resulting SAM coating. SAMs are created by chemisorption of the head groups onto the surface from either a vapor or liquid phase. The head groups closely assemble on the material with the tail groups extending away from the material. The self-assembled monolayer can be, for example, an organosilane (e.g. alkyl trichlorosilane, fluorinated alkyl trichlorosilane, alkyl trialkyloxysilane, fluorinated alkyl trialkyloxysilane, etc.).

The precursor compound of the SAM may be present in any conventionally-used organic solvent, inorganic solvent, water, or any mixture thereof. Examples of suitable organic solvents may include, but are not limited to, alcohols (e.g., methyl alcohol, ethyl alcohol, n-propyl alcohol, isopropyl alcohol, n-butyl alcohol, sec-butyl alcohol, t-butyl alcohol, isobutyl alcohol, and diacetone alcohol); ketones (e.g., acetone, methylethylketone, methylisobutylketone); glycols (e.g., ethyleneglycol, diethyleneglycol, triethyleneglycol, propyleneglycol, butyleneglycol, hexyleneglycol, 1,3-propanediol, 1,4-butanediol, 1,2,4-butantriol, 1,5-pentanediol, 1,2-hexanediol, 1,6-haxanediol); glycol ethers (e.g., ethyleneglycol dimethyl ether, and triethyleneglycol diethyl ether); glycol ether acetates (e.g., propylene glycol monomethyl ether acetate (PGMEA)); acetates (e.g., ethylacetate, butoxyethoxy ethyl acetate, butyl carbitol acetate (BCA), dihydroterpineol acetate (DHTA)); terpineols (e.g., trimethyl pentanediol monoisobutyrate (TEXANOL)); dichloroethene (DCE); chlorobenzene; and N-methyl-2-pyrrolidone (NMP).

The concentration of the precursor compound in the solution may be determined by those skilled in the art according to the intended applications and purposes and may be in the range of about 5 to about 20 mM.

An example of a commercially available low surface energy SAM is 1H,1H,2H,2H-perfluorodecyltrichlorosilane (also known as, heptadecafluoro-1,1,2,2-tetrahydro-decyl-1-trichlorosilane) [CAS: 78560-44-8], of course, other low surface energy SAM materials could be used. In general the class of fluorinated organosilane derivatives would work as low energy SAM materials. Other examples of commercially available low surface energy SAMs include: trifluoropropyltrimethoxysilane, heneicosafluorododecyltrichlorosilane, nonafluorohexyltrimethoxysilane, methyltrichlorosilane, ethyltrichlorosilane, propyltrimethoxysilane, hexyltrimethoxysilane, n-octyltriethoxysilane, n-decyltrichlorosilane, dodecyltrichlorosilane, and octadecyltrichlorosilane.

An example of a commercially available high surface energy SAM is (3-aminopropyl)-trimethoxysilane [CAS: 13822-56-5]. Of course, other high surface energy SAM materials could be used. The general class of organosilanes with amine, alcohol, or mercapto substituents would provide for a high surface energy SAM, relative to the above. Some commercially available examples include: (3-Mercaptopropyl)trimethoxysilane, methyl 11-[dichloro(methyl)silyl]undecanoate, acetoxyethyltrichlorosilane, and vinyltriethoxysilane.

Examples of commercially available oleophilic SAM materials fall within the general class of 1-18 carbon alkylsilanes with a hydrolyzable reactive group (e.g., F, Cl, Br, and I) and alkoxys (e.g., methoxy, ethoxy, and propoxy). Such chemicals are readily available, for example, from Gelest and Sigma Aldrich, and include methyltrichlorosilane, ethyltrichlorosilane, propyltrimethoxysilane, hexyltrimethoxysilane, n-octyltriethoxysilane, n-decyltrichlorosilane, dodecyltrichlorosilane, and octadecyltrichlorosilane. In addition to the alkyl class, other functional SAMs, such as the following, are also are advantageous: 3-aminopropyltrimethoxysilane, methyl 11-[dichloro(methyl)silyl]undecanoate, acetoxyethyltrichlorosilane, vinyltriethoxysilane, and nonafluorohexyltrimethoxysilane.

Various oleophobic SAM materials are commercially available and suitable for use.

In some implementations, particularly for silane-containing SAM materials (which are typically low energy materials), the SAM material has a carbon chain having no more than 18 carbon atoms; SAM materials having a carbon chain with 10 carbon atoms or 12 carbon atoms are examples.

Figure 3:
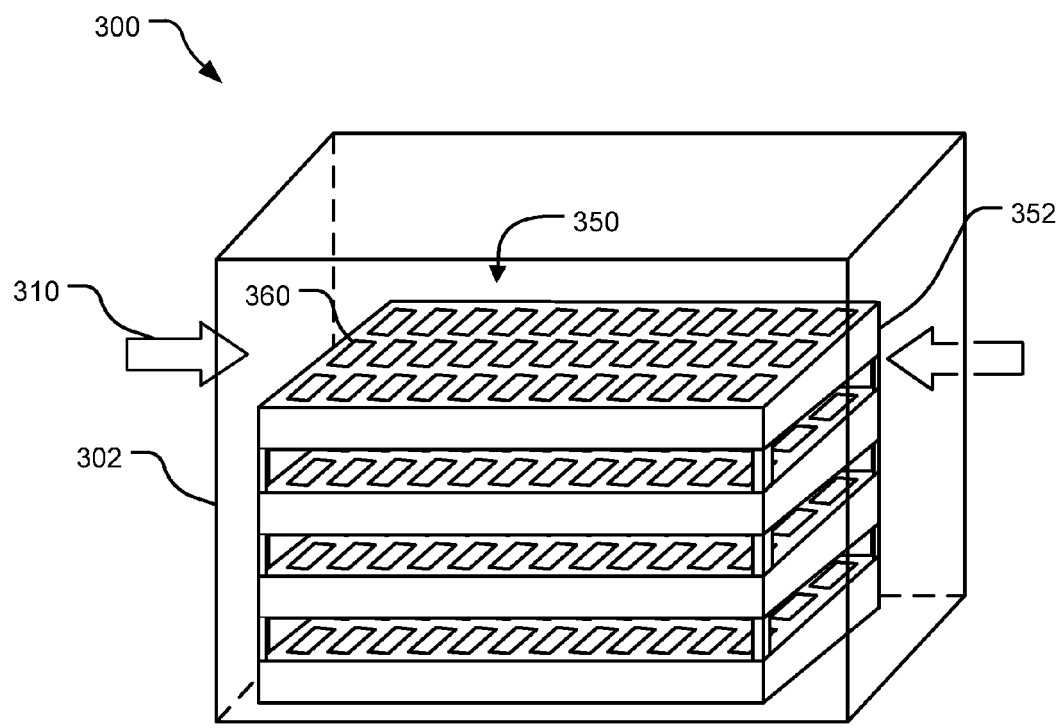
FIG. 3 is a schematic perspective view of a deposition chamber for applying a self-assembled monolayer (SAM) coating onto a slider.

As indicated above, by coating the ABS 210 of the slider 200 with SAM material, contaminants are reduced. Depending on the process to coat the SAM material on the slider 200, surfaces where no SAM material is desired may nevertheless become coated. FIG. 3 illustrates one implementation of process equipment suitable for coating a SAM material onto a slider.

In FIG. 3, a coating apparatus 300 is illustrated. The coating apparatus 300 has a deposition chamber 302, in which a coating can be applied to a surface. In the particular implementation shown in FIG. 3, the deposition chamber 302 is a plasma deposition chamber. In other implementations, the chamber can be one configured for ion beam deposition chamber, chemical vapor deposition (CVD), e-beam, etc., and any combination thereof.

The coating apparatus 300 uses an energy source, such as radiofrequency (RF) energy or microwave (MW) energy, to generate a plasma. Not indicated in FIG. 3, the plasma may flow, for example, from side-to-side in the chamber 302, from top-to-bottom or bottom-to-top of the chamber 302, from corner-to-corner of the chamber 302, or in any other flow pattern. Any array of baffles may be in the chamber 302 to affect plasma diffusion and/or uniformity within the chamber 302. In FIG. 3, a plasma flow is shown generically as the plasma 310 entering the chamber 302.

The material to be coated (applied), i.e., the SAM material, by the coating apparatus 300 is shown generically as material 320 entering the chamber 302. The SAM material 320, during the deposition process, is a vapor, however, the source of the SAM material 320 may be a vapor or a liquid (e.g., solution or dispersion) that is vaporized either outside of the chamber 302 or inside of chamber 302.

Present within the chamber 302 is an object to be coated 350, in this particular implementation, a plurality of sliders 360 that are loosely held in or on trays 352 that are vertically stacked in a spaced manner. Thus, the plasma 310 and SAM material 320 have access to all surfaces of the sliders 360. The trays 352 and other features within the chamber 302 may be designed to affect plasma diffusion and/or uniformity to the sliders 360. Typically, the SAM material 320 coats all surfaces of the sliders 360.

Referring back to FIGS. 2A through 2D, the SAM material 320 coats the ABS 210 but may also coat the leading face 214, the trailing face 216, the side faces 218, 219 and the back pad 220. Unfortunately, having a continuous SAM coating on all of the leading face 214, the trailing face 216, the side faces 218, 219 and the back pad 220 is not desired in all situations. To avoid having a SAM coating, or a continuous SAM coating, on one of these surfaces, the surface can be masked prior to coating the SAM material, or, the SAM material, once coated on the surface, can be removed from the surface. In accordance with this disclosure, the SAM material is removed after having been coated onto the surface.

The methods of this disclosure use a 'line of sight' UV irradiation process at a wavelength sufficient to remove SAM material from a surface, e.g., back pad 220, of the slider 200. SAM material is undesired on the back pad 220 of the slider 200 because having SAM on the back pad 220, at least where adhesive may be placed, inhibits adhesion of the slider 200 to the HGA of the actuator assembly (see, FIG. 1 and the actuator assembly 120). The UV irradiation process can use a wavelength of about 100-200 nm, e.g., 160-190 nm, e.g., 170-185 nm, e.g., 185 nm, e.g., 172 nm. Two or more different wavelengths can be used. Some wavelength(s) are able to generate localized ozone ($O_3$), which facilitates removal of SAM material. As an example, an exemplary UV irradiation process uses either a 185 nm or 172 nm wavelength light to activate $O_2$ molecules to form ozone ($O_3$) and monoatomic oxygen (O), which are highly reactive. The $O_3$ and O react with the C—C bonds of the SAM material to oxidize it into $CO_2$. At room temperature, the $CO_2$ evaporates off the surface. The $O_3$ and O also reacts with and removes some contaminants that may be on the surface.

In some implementations, the deposition chamber used to deposit the SAM coating (e.g., deposition chamber 302 from FIG. 3) can be used for the irradiation process. A particular suitable UV irradiation process is a VUV (vacuum UV) irradiation process, where the UV radiation is applied to a target (i.e., the slider surface) while in a vacuum chamber; utilizing a vacuum chamber allows for precise control over the amount of $O_2$ present during the UV irradiation process. In alternate processes, the UV radiation can be applied to the slider surface while under atmospheric conditions, using the $O_2$ already in the atmosphere. In some implementations, the UV radiation source (e.g., light) is in very close proximity, e.g. 1-5 mm, to the slider surface. Such a close proximity facilitates the process, because the farther away from the surface the radiation source is, the more likely the $O_3$ and O will be generated above the surface and not close enough to the surface to react with the SAM material or organic contamination on the surface.

Figure 4:
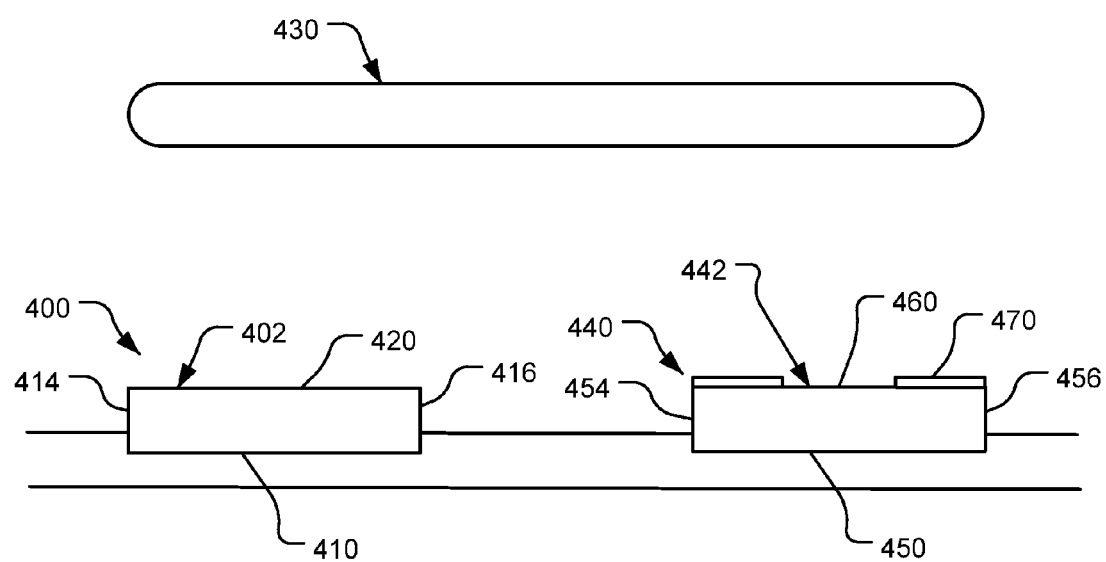
FIG. 4 is a schematic diagram of a 'line of sight' UV irradiation process.

The portion of the slider from which the SAM is not to be removed, i.e., the portions where the SAM material is to remain, may be covered with a mask, but with 'line of sight' removal, such as with 172 nm or 185 nm UV radiation, only the SAM on that surface (or those surfaces) directly hit by the UV radiation will be removed. FIG. 4 illustrates an example of a 'line of sight' irradiation removal process.

In FIG. 4, a slider 400 is shown having a body 402 with an ABS 410, a leading face 414, a trailing face 416 and a back pad 420. Although not called out in FIG. 4, the slider 400 also has a leading edge, a trailing edge, side edges and side walls. The slider 400 is positioned in a tray, for example, a tray as is commonly used for washing sliders or for transporting sliders. Alternately, the tray can be a tray used during a SAM deposition process (e.g., tray 352 of FIG. 3).

Also shown in FIG. 4 is a UV radiation source 430, e.g., a low pressure mercury vapor grid lamp (e.g., 185 nm or 254 nm wavelength), or a xenon excimer (or, eximer) lamp (e.g., 172 nm wavelength). UV radiation, from source 430, strikes only that surface (or those surfaces) that are in a direct line of sight. As can be seen, the UV radiation strikes the back pad 420 and thus removes any SAM material present on the back pad 420, but the radiation does not affect the SAM material present on the leading face 414 or the trailing face 416. By using a 'line of sight' UV irradiation process, as illustrated in FIG. 4, labor intense alignment of mask(s), e.g., to protect the leading face, trailing face, or side walls, can be avoided.

However, in some embodiments, a pattern on the surface may be desired. FIG. 4 also shows an implementation where a slider 440 has a body 442 with an ABS 450, a leading face 454, a trailing face 456 and a back pad 460. Present on at least a portion of the back pad 460 is a mask 470. In that area where the mask 470 is present, the UV radiation will not strike the back pad 470 and thus the SAM material will not be removed. With 172 nm wavelength radiation, the pattern of removed/unremoved SAM can be accurate to within 100 nm. Such a masking process may be used, e.g., when it is desired to remove the SAM material only in that area where adhesive will be placed to adhere the slider to the HGA.

A masking process can also be used to create a pattern of SAM and no-SAM on any of the surfaces (e.g., ABS 450, leading face 454, trailing face 456), such as for implementations where the SAM coating is designed to direct fluid flow across the surface. Any pattern can be made that has the SAM coating on, e.g., no more than 75% of the surface, no more than 50% of the surface, or no more than 25% of the surface. Yet additionally, a surface can be provided with more than one SAM material by masking. For example, a surface can be coated with SAM, and then a portion of the SAM removed by the disclosed methods. A second or additional SAM could be applied to the total surface, but which would only bond to the area where the SAM had been previously removed. Such a process can be used for a pattern with a first SAM (e.g., lower surface energy SAM) and a second SAM (e.g., high surface energy SAM).

Figure 5:
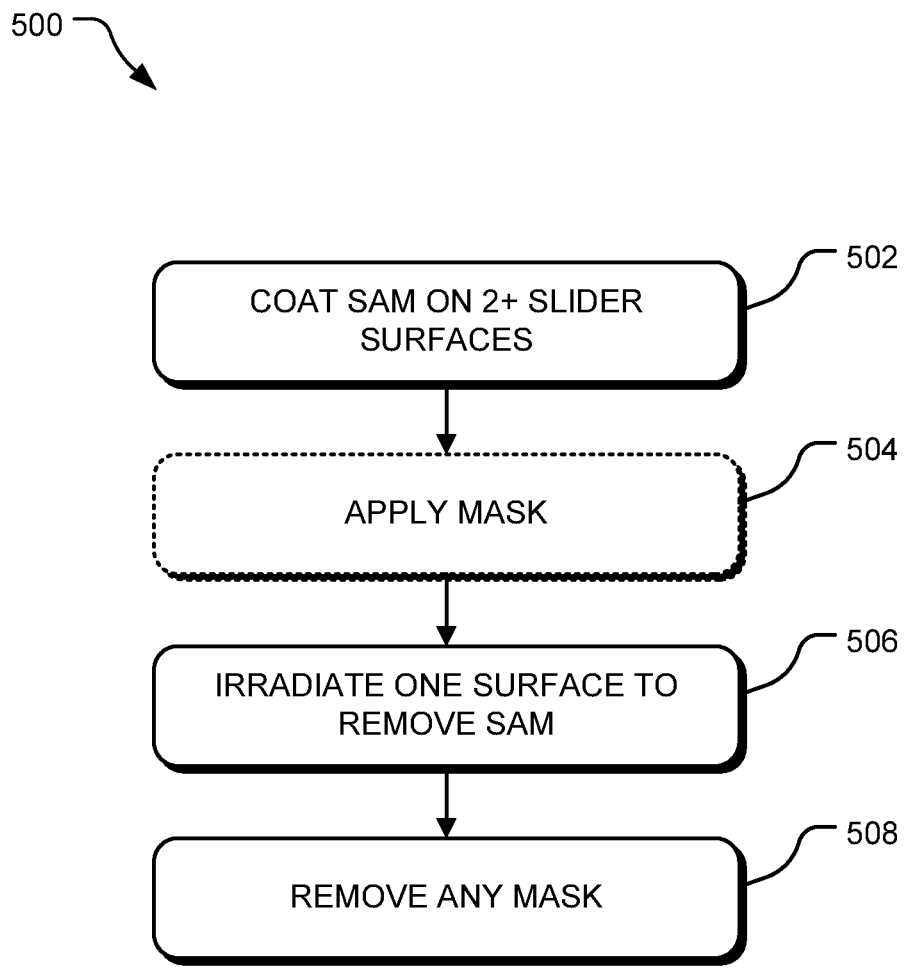
FIG. 5 is a flow chart showing a method of applying a self-assembled monolayer (SAM) material to a slider.

In FIG. 5, a method 500 for patterning a SAM material on a surface (e.g., a slider back side or slider back pad) is stepwise illustrated; method 500 includes applying a SAM material and then removing a portion of the applied SAM material.

In step 502, a SAM material is applied to at least two surfaces of a slider. In step 504, SAM material is coated onto the surface. The slider surface may or may not have a protective overcoat prior to applying the SAM material. The SAM material may be applied (coated) by any method conducive to applying SAM material onto either the slider surface or the protective overcoat.

In optional step 504, a mask (e.g., hard mask or photomask) is placed on the one of the two SAM-coated slider surfaces from which the SAM material is to be removed.

In step 506, the one of the two SAM-coated slider surfaces is irradiated with UV radiation at a wavelength that is sufficient to remove or chemically alter the SAM material; example wavelength ranges include 100-200 nm, 160-190 nm, and less than 185 nm, with 172 nm being one particular example of a suitable wavelength to use.

In step 508, any mask from step 504 is removed.

The resulting slider, having some SAM material removed from a surface, can be incorporated into a disc drive assembly, such as disc drive 100 of FIG. 1. Adhesive can be used to connect the slider to the HGA of the actuator assembly (e.g., actuator assembly 120 of FIG. 1).

Various implementations for forming and/or removing a self-assembled monolayer (SAM) coating on a surface have been described above. The above specification provides a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, any numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
    applying a self-assembled monolayer (SAM) coating on at least a first surface of a slider and on a second surface of the slider opposite the first surface; and
    removing at least a portion of the SAM coating from the second surface by irradiating the second surface with a UV radiation in a wavelength range of 100-200 nm.

2. The method of claim 1, wherein the first surface is an air-bearing surface (ABS) of the slider and the second surface is a back pad.

3. The method of claim 1, wherein removing at least a portion of the SAM coating from the second surface comprises masking a second portion of the SAM coating on the second surface.

4. The method of claim 1 comprising removing the entire SAM coating from the second surface.

5. The method of claim 1, wherein the UV radiation has a wavelength of 185 nm.

6. The method of claim 5, wherein the UV radiation has a wavelength of 172 nm.

7. The method of claim 1, wherein the irradiating is done in a vacuum chamber.

8. The method of claim 1, wherein the irradiating is done within 5 mm of the second surface of the slider.

9. The method of claim 1, wherein the irradiating is done under atmospheric conditions.

10. The method of claim 1, wherein applying a SAM coating comprises applying the SAM coating to six surfaces of the slider.

11. The method of claim 1, further comprising after applying the SAM coating, masking a portion of the second surface.

12. A method comprising:
    providing a slider having an air-bearing surface (ABS), a leading face, a trailing face, opposite side walls extending and connecting the leading face and the trailing face, and a back pad opposite the ABS, with a self-assembled monolayer (SAM) material present on each of those surfaces; and
    irradiating the back pad with a UV radiation in a wavelength range sufficient to remove SAM material from the back pad while retaining the SAM material on the leading face, the trailing face and the side walls.

13. The method of claim 12, wherein the irradiating is at a UV wavelength range of 100-200 nm.

14. The method of claim 12, wherein the irradiating is at a UV wavelength of 172 nm.

15. The method of claim 12, wherein the irradiating is done in a vacuum chamber.

16. The method of claim 12, wherein all of the SAM material from the back pad is removed.

17. A slider having an air-bearing surface (ABS), a leading face, a trailing face, opposite side walls extending and connecting the leading face and the trailing face, and a back pad opposite the ABS, with a self-assembled monolayer (SAM) coating covering the entire ABS and not covering the entire back pad.

18. The slider of claim 17, wherein the SAM coating covers no more than 75% of the back pad.

19. The slider of claim 17, wherein the SAM coating covers no more than 50% of the back pad.

20. The slider of claim 17, where no SAM coating is present on the back pad.

* * * * *